Figure 1:
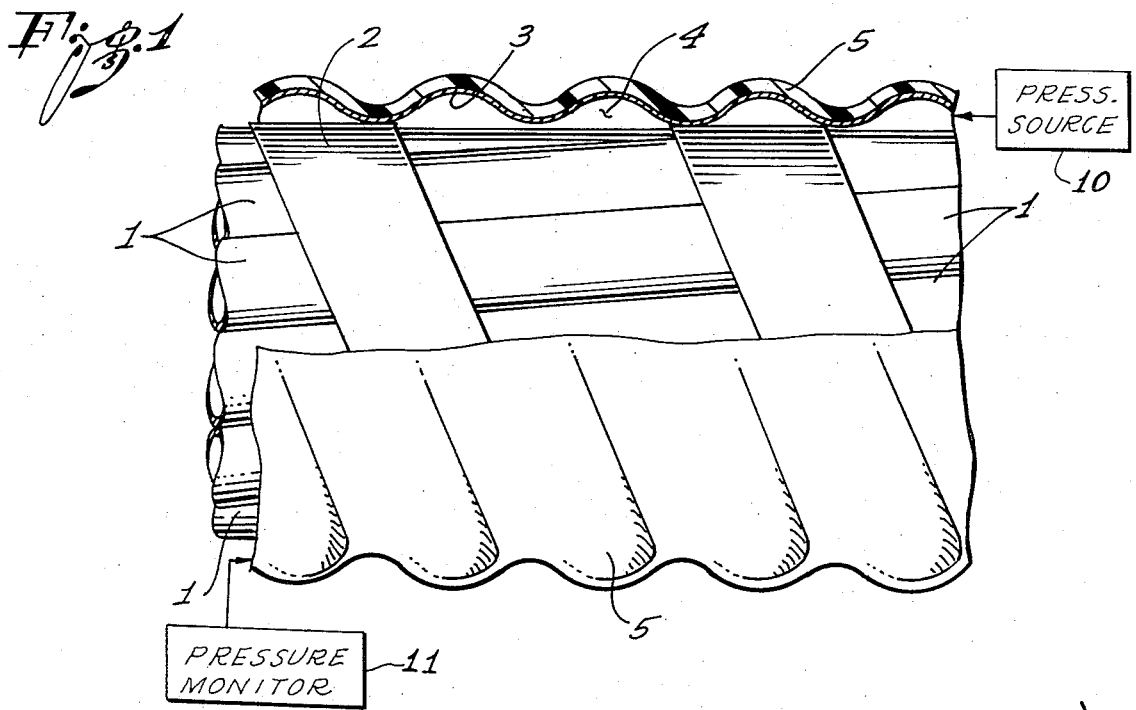

United States Patent [19]
Cramer et al.

[11] 3,866,670
[45] Feb. 18, 1975

[54] TUBE BUNDLE CABLE

[75] Inventors: Christoph Cramer; Hans-Martin Schmidtchen; Hans Jurgen Schwartze, all of Osnabrueck; Bernd Eichmeyer, Lechtingen, all of Germany

[73] Assignee: Kabel-und Metallwerke Gutehoffnungshutte Aktiengesellschaft, Hannover, Germany

[22] Filed: Mar. 9, 1972

[21] Appl. No.: 233,157

Related U.S. Application Data
[63] Continuation of Ser. No. 10,502, Feb. 11, 1970, abandoned.

[30] Foreign Application Priority Data
Feb. 22, 1969 Germany.......................... 1908993

[52] U.S. Cl.................... 165/47, 236/98, 138/111
[51] Int. Cl.............................................. F24h 3/00
[58] Field of Search .......... 165/184, 140, 164, 172, 165/141, 165, 117; 236/98; 138/111, 112

[56] References Cited
UNITED STATES PATENTS
| | | | |
|---|---|---|---|
| 2,578,280 | 12/1951 | Barnard............................. | 138/111 |
| 3,490,496 | 1/1970 | Stearns............................. | 138/112 |
| 3,529,632 | 9/1970 | Johns................................ | 138/111 |

*Primary Examiner*—Charles Sukalo
*Attorney, Agent, or Firm*—Ralf H. Siegemund

[57] ABSTRACT

A bundle of stranded tubes is enclosed in and received by a corrugated sleeve.

12 Claims, 2 Drawing Figures

PATENTED FEB 18 1975 3,866,670

INVENTORS:
Christoph Cramer
Hans-Martin Schmidtchen
Hansjürgen Schwartze
Bernd Eichmeyer By Smyth, Roston & Pavitt
ATTORNEYS

TUBE BUNDLE CABLE

This is a continuation of application Ser. No. 10,502, filed Feb. 11, 1970, now abandoned.

The present invention relates to a tube bundle cable which comprises a plurality of tubes each provided for transmission of pneumatic or hydraulic signals, such as measuring values, control pulses or the like.

In the course of progressing automation, remote control devices using pneumatic or hydraulic techniques are increasingly employed. For the telemetric transmission of fluidics signals, bundled tubes forming a cable are employed, the bundle including a plurality of individual tubes or pipes for the transmission of pneumatic or hydraulic control and measuring pulses, particularly over large distances. For this it is particularly enconomical to combine such a plurality of individual tubes into a tube-cable using, for example, stranding techniques to establish such a cable-like structure out of such a bundle of tubes. For example, in the chemical industry increasingly tubes are being employed for pneumatically transmitting measuring and control pulses from one part of the equipment to another one. Such usage has become particularly important because the equipment as a whole is always subject to the danger of explosion. Also, sampling of probes, for example, of liquidous or gaseous materials and their transmission to a remote location is carried out by means of such tube cables. Also, forces and power required for hydraulic or pneumatic remote control can be transmitted in that manner; tension and pressure measuring values can likewise be hydraulically or pneumatically transmitted. Flushing air for measured values of pressure and flow quantities are pneumatically transmitted, particularly if the media involved are chemically agressive gases or vapors. Also, tools, such as dies, presses, etc. are successfully controlled from a remote location by pneumatic or hydraulic signal transmission techniques.

A type of tube cable has become known in which a plurality of pipes are positioned in a common plane, and they run parallel to each other. They are covered with a common coating of sprayed-on plastic materials. Alternatively, such tubes run parallelly to each other in the interior of a hose. In case the tubes included in such a cable transmit liquids, it is necessary to maintain a required degree of viscosity so that the media do in fact flow sufficiently vigorously. Also, if gases are to be transmitted, their condensation and precipitation in the interior of a tube has to be prevented. For these reasons, known tube cables are employable in some cases only, and under certain, favorable ambient conditions, as maintaining particular temperature in and along such cable becomes of particular importance.

In accordance with the present invention, tube cables comprised of a plurality of tubes and individually provided for the transmission of hydraulic or pneumatic signals, or the like, are improved. In accordance with the invention, a bundle of tubes forming a cable is to be enveloped by a corrugated sleeve. The sleeve is constructed from a longitudinal tape which has been bent and shaped into a tube, welded and corrugated. The resulting tube cable is characterized by particularly high arch stiffness and lateral stability, but it is also very flexible, to the degree the sleeve is flexible. The high mechanical strength and stability comes into play, particularly when such a cable is installed underground and also, the individual tubes are protected considerably better than in the known types of tube cables. Such a cable can be manufactured by way of continuous production, as an endless cable, which is reeled on drums for transportation, and cut where needed.

In accordance with an additional feature of the invention, the corrugation is to be a helical one. This way one obtains the added advantage that between tube bundle and corrugated sleeve there is set up a helical channel or channels, usable as duct for conducting a heating or a cooling medium, to flow in the interior of the sleeves and in direct contact with the tubes included in the bundle. Essentially, a helical channel established in this manner can be passed through by a medium, the temperature of which is maintained rather accurately constant, through external means. As long as a sufficiently vigorous flow of that heating or cooling medium is sustained, the temperature and physical state of the liquids or gases passing through the individual tubes within the cable can be maintained, so that flow conditions remain constant throughout the extension of that cable. Therefore, a thermal disturbance and falsification of the quantitative value represented by these fluidics type signals is readily avoided.

In the foregoing it has been described that, so to speak, a bundle of tubes is provided with a sleeve placed on and around it. However, it may be of advantage to produce a double or multiple sleeve system, i.e., there is first an inner sleeve or pipe, corrugated as described and through which pass the tubes proper of the cable. Next, there is an outer sleeve or pipe likewise being corrugated. The space in between these two co-axial sleeves or pipes is passed through by a cooling or heating medium, as the case requires.

The space between the tubes of the bundle and the corrugated sleeve around it can also be filled with a pressurized medium. This in itself is a source for a pneumatic signal representative of the operate state of the cable. The pressure in the cable sleeve is maintained. Should there occur any damage to one of the tubes included in the cable, there may be a noticeable pressure change, such as a pressure increase (or decrease), within the space between the tube bundle and the sleeve, and that pressure change can be detected and even be used for controlling suitable warning, controlling, turn-off or shut-off devices. On the other hand, pressure between sleeve and tube bundle can serve as supporting pressure for the individual tubes so that these, in turn, can be operated at a higher internal pressure, i.e., the pressure differential between an individual one of the tubes, or several thereof, included in the cable, and the immediate environment is reduced. The immediate environment is the high pressure interior of the corrugated sleeve around the tubes of the bundle.

The respective outer sleeve is covered on its outer surface with an insulating layer, so that the medium flowing underneath and provided for cooling or heating is itself protected against temperature variations of the exterior. Preferably an insulating, plastic layer is extruded upon the outer sleeve of the cable system. The cooling or heating medium flowing in the channel between the sleeve and the bundle of tubes may be gaseous or liquidous.

The sleeve is preferably made of metal, and the individual tubes included in the tube bundle are likewise preferably made of metal. Metal tubes are of particular advantage when the temperature of a cooling or heating medium is to be readily transmitted, at low heat transfer resistance, to the interior of the tubes and the media passing therethrough. It was found that copper or aluminum tubes are very suitable because they have very good thermal conductivity.

The individual tubes themselves can likewise be corrugated to enhance flexibility of the cable bundle as a whole. Moreover, corrugation of the tubes increases actually the effective surface area in each of them which, in turn, increases heat transmission to or from the interior of the tubes, from or to the interior of the sleeve and the heating or cooling media therein.

Figure 2:
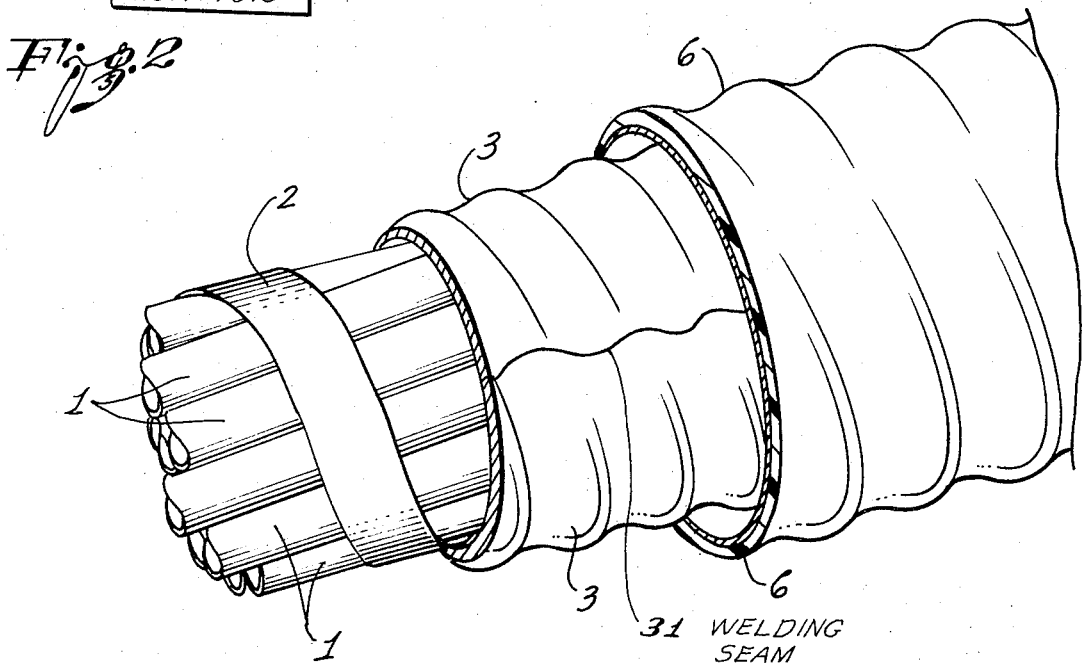

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings, in which:

FIG. 1 illustrates somewhat schematically a view into a bundle tube cable in accordance with the preferred embodiment of the present invention; and FIG. 2 illustrates an open view into a plural sleeve cable in accordance with another embodiment of the invention.

The cable itself includes a plurality of tubes 1 consisting of plastic or metal, preferably copper or aluminum. The individual tubes can be corrugated, in order to obtain sufficient flexibility and to increase the area available for heat transfer between interior and exterior of such a tube. The tubes as a bundle are stranded to a regular arrangement of stranded elongated elements. The tubes in the stranded bundle are maintained in position by a tape 2, which can be made of plastic or may consist of a thin metal foil and which is helically wound upon the stranded bundle of tubes.

Concentrical to this stranded bundle of tubes 1 there is now provided a corrugated, outer sleeve 3. Originally there has been a tape which ran into the production line, parallel to the bundle of stranded tubes. That tape has been shaped, bent and longitudinally wrapped around the cable bundle to obtain tubular contour. Subsequently adjoining edges of the tape have been longitudinally welded to close the sleeve. Finally, the sleeve has been corrugated. Preferably and economically that sleeve 3 may be made from a metal tape; however, it was found that a plastic sleeve made, for example, of polyethylene is likewise usable.

The sleeve 3 is on its outside provided with a plastic coating 5 for protecting the sleeve against corrosion and for providing overall thermal insulation. As can be seen, the corrugations of sleeve 3, particularly if having helical contour, establish correspondingly helical channel 4. There may be a single or multiple helix in the corrugation and a single channel or plural, intertwined channels result therefrom accordingly. Fluid is passed through this channel or channels to establish constant temperature conditions in the interior of sleeve 3 and throughout the cable as a whole. This way the different media transmitting fluidic signals for control and measuring purposes, operate under constant environmental conditions, and their flow is not impeded nor uncontrollably varied by temperature variations as they may occur along the extension of the cable if otherwise unprotected. Also, the heating or cooling fluid will penetrate the space in between the tubes, so that rather extensive circulation can be maintained in the interior of sleeve 3, around each individual one of the tubes 1.

The medium in the space between sleeve 3 and tubes 1 may be pressurized to serve as supporting pressure and/or as indicator as to any pressure change in any of the tubes due to leakage in the cable.

As indicated somewhat schematically in FIG. 2, the sleeve 3 may actually be the inner one of a concentrical tube system. There is then provided an outer, likewise corrugated sleeve 6. Sleeve 6 is outwardly coated with a protective, insulating layer. Together with sleeve 3, sleeve 6 defines a ring space. The fluid required for maintaining particular temperature conditions in the cable, or one of the media so used, can flow through that space between sleeves 3 and 6. One may choose this type of structure if the environmental conditions under which this cable is to be operated are particularly severe; for example, the temperature differential between the exterior and the media flowing through the several tubes 1 may be rather large. Also, it can be seen that the bundle of tubes in sleeve 3 should be more or less firmly positioned therein. This, in turn, limits to some extent the available flow space for the cooling or heating medium, and, therefore, for long extensions of such a cable it may become difficult to maintain constant temperature conditions throughout the extension of the cable. Considerable quantities of heating or cooling fluid may flow in the ring space between sleeves 3 and 6, augmenting the heating and cooling effect produced by heating or cooling fluid in the interior of sleeve 3.

The invention is not limited to the embodiments described above, but all changes and modifications thereof not constituting departures from the spirit and scope of the invention are intended to be covered by the following claims.

We claim:

1. Conduit structure for a plurality of different fluids, at least some of them being pressurized, comprising:

a plurality of individual tubes disposed in relation to each other to form a cable bundle;

a longitudinally bent and longitudinally seam welded tape establishing a tubular jacket around the tubes, the jacket being pressure proof by virtue of the longitudinal seam welding and having helical corrugation which defines helical channels inside of the jacket; and fluid maintained in the helically corrugated jacket and flowing in and along the helical channels inside of the jacket but in helical, circumscribing flow as to the bundle, for uniformly providing the fluid in heat exchange contact with the bundle from the periphery thereof to obtain temperature isolation of the tubes of the bundle from the environment.

2. Conduit structure as in claim 1, the fluid in the jacket being a coolant.

3. Conduit structure as in claim 1, the fluid in the jacket being a heating fluid.

4. Conduit structure as in claim 1, the jacket being filled with a fluid maintained under particular high pressure having value between external pressure and pressure in the tubes.

5. Conduit structure as in claim 1, the jacket being filled with a fluid maintained under particular pressure, there being means to monitor the pressure.

6. Conduit structure as in claim 1, there being a second, outer jacket disposed around said first sleeve, the second sleeve concentrically receiving the first sleeve.

7. Conduit structure as in claim 6, there being a cooling or heating fluid in the ring space between the first and the second sleeves.

8. Conduit structure as in claim 6, an insulating layer on the second sleeve.

9. Conduit structure as in claim 1, an insulating layer on the sleeve.

10. Conduit structure as in claim 1, the tubes of the plurality made of metal.

11. Conduit structure as in claim 10, the metal being copper.

12. Conduit structure as in claim 1, the tubes of the plurality being corrugated.

* * * * *